(12) United States Patent
Becker et al.

(10) Patent No.: US 6,702,307 B2
(45) Date of Patent: Mar. 9, 2004

(54) WHEEL SUSPENSION FOR A MOTOR VEHICLE

(75) Inventors: Dietmar Becker, Tamm (DE); Swen Zschocke, Weissach/Flac (DE); Brian Giessel, Leonberg (DE); Michael Laub, Stuttgart (DE)

(73) Assignee: Dr. Ing. h.c.F. Porsche AG, Stuttgart (DE)

( * ) Notice: Subject to any disclaimer, the term of this patent is extended or adjusted under 35 U.S.C. 154(b) by 0 days.

(21) Appl. No.: 09/964,841

(22) Filed: Sep. 28, 2001

(65) Prior Publication Data

US 2002/0041076 A1 Apr. 11, 2002

(30) Foreign Application Priority Data

Sep. 28, 2000 (DE) .......................................... 100 48 121

(51) Int. Cl.⁷ ................................................ B60G 3/18
(52) U.S. Cl. .............................................. 280/124.141
(58) Field of Search .................. 280/124.141, 124.142, 280/124.179, 124.135, 124.138, 124.139; 384/584

(56) References Cited

U.S. PATENT DOCUMENTS

| 3,598,385 A | | 8/1971 | Parsons, Jr. | |
|---|---|---|---|---|
| 3,787,073 A | * | 1/1974 | Lievore | ....................... 280/789 |
| 4,657,271 A | * | 4/1987 | Salmon | ................ 280/124.139 |
| 5,080,389 A | * | 1/1992 | Kawano et al. | ........ 280/124.142 |

FOREIGN PATENT DOCUMENTS

| DE | 37 35 544 | 5/1989 |
|---|---|---|
| DE | 42 03 057 | 8/1993 |
| GB | 2328190 | 2/1990 |
| GB | 2 328 190 | 2/1999 |

* cited by examiner

*Primary Examiner*—Eric Culbreth
*Assistant Examiner*—Faye M. Fleming
(74) *Attorney, Agent, or Firm*—Crowell & Moring LLP

(57) ABSTRACT

A wheel suspension system for motor vehicles has a horizontally positioned spring-and-damper unit which, by way of levers and links, interacts with wheel carriers of opposite wheels. In order to design the wheel suspension system in a favorable manner with respect to space requirements while ensuring proper functioning of its components, a horizontally positioned spring-and-damper unit and a lever, which can be swivelled about an axis which is upright or relatively slightly inclined, are provided for each side of the wheel. The lever is applied by way of a first lever section to the spring-and-damper unit and is connected, by way of a second lever section as well as a first link to one of the wheel carriers. The lever is connected to a stabilizer by way of a third lever section as well as a second link.

31 Claims, 5 Drawing Sheets

WHEEL SUSPENSION FOR A MOTOR VEHICLE

BACKGROUND AND SUMMARY OF THE INVENTION

This application claims the priority of German Patent Document 100 48 121.3, filed Sep. 28, 2000, the disclosure of which is expressly incorporated by reference herein.

The invention relates to a wheel suspension system for motor vehicles, particularly passenger cars, comprising an approximately horizontally positioned spring-and-damper unit which, by way of levers and links, interacts with wheel carriers of opposite wheels.

A known wheel suspension system, as in British Patent Document GB 1 300 028 and corresponding U.S. Pat. No. 3,598,385, of the initially mentioned type, has a spring-and-damper unit, a coil spring surrounding a damper, which is aligned transversely with respect to a longitudinal direction of the vehicle, is horizontally arranged and is connected with levers at both ends. The levers can be swivelled about an axis extending in the longitudinal direction of the vehicle and are connected by means of links to wheel carriers of opposite wheels. The construction and the position of the spring-and-damper unit or of the levers, also the projecting size of the latter, specifically in the transverse direction of the vehicle, not only require considerable space, which makes the accommodation of assemblies, pieces of luggage or the like more difficult, but, in addition, impairs the free design of a motor vehicle in the area or adjacent to the area of a wheel suspension system.

In British Patent Document GB 2 328 190, a wheel suspension system is discussed which comprises a horizontally positioned spring-and-damper unit for each wheel side and interacts with the pertaining wheel by way of levers and links. Both damper units are linked to a central rhombic plate, and the levers are constructed such that they can be swivelled by way of axes aligned in the longitudinal direction of the vehicle. This construction also has the disadvantage that the space between the oppositely arranged wheels can essentially be utilized only for components of the wheel suspension system.

It is therefore an object of certain preferred embodiments of the invention to provide a wheel suspension system for motor vehicles which have a space-saving construction while providing good operation. However, special attention should also be paid to the construction of the bearings of levers of the wheel suspension system on a vehicle body structure.

According to certain preferred embodiments of the invention, this is achieved by providing, for a wheel, the horizontally positioned spring-and-damper unit and a lever which said lever can be swivelled about one of an upright and inclined axis and which, by way of a first lever section, said lever is applied to the spring-and-damper unit, by way of a second lever section as well as a first link, is connected to the wheel carrier of the wheel and, by way of a third lever section as well as a second link, is connected to a stabilizer. Additional characteristics further developing certain preferred embodiments of the invention are described herein and in the claims.

Principal advantages achieved by way of certain preferred embodiments of the invention are that, because of the construction of the spring-and-damper unit, of the lever and of the links, the construction for each side of the wheel meets extensive demands, such as wheel guidance and distribution of forces, on a high-performance wheel suspension system. In this case, the space requirement of the components of the wheel suspension system is acceptably low, so that other assemblies as well as pieces of luggage can be accommodated in a simple manner. Furthermore, the lever for receiving the links has a clear design principle and so does its bearing on the journal which establishes a high-strength connection with the body structure of the motor vehicle. Finally, the bearing journal, which is made of metal, and its components, which are made of the same material, with respect to their special construction, are very suitable for the arrangement on a vehicle body structure made of a composite material, such as carbon-fiber-reinforced plastic, and thus for the advantageous bearing of the lever on the above-mentioned body structure.

Other objects, advantages and novel features of the present invention will become apparent from the following detailed description of the invention when considered in conjunction with the accompanying drawings.

DETAILED DESCRIPTION OF THE DRAWINGS

Figure 1:
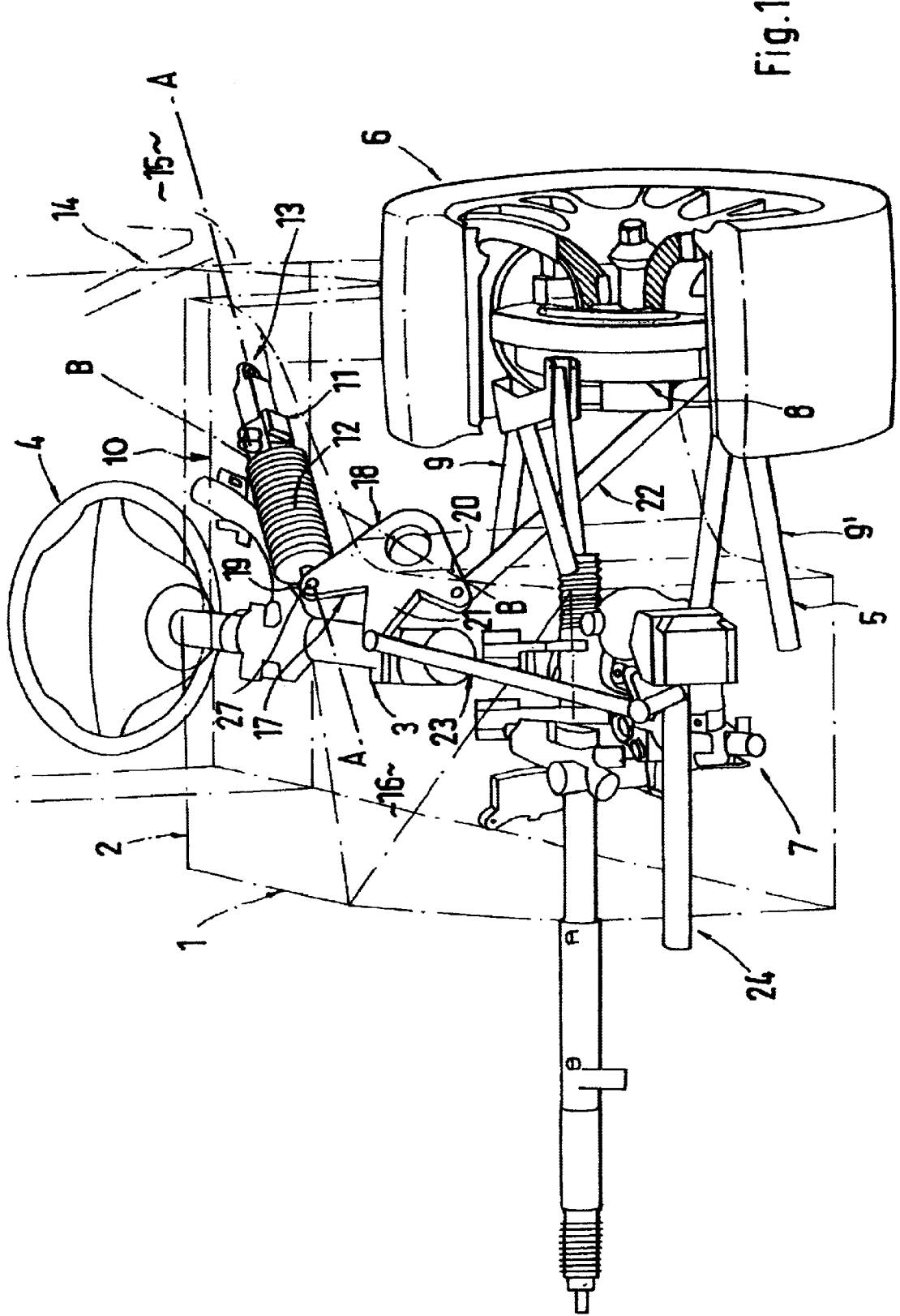
FIG. 1 shows a partial diagonal view of a motor vehicle from the front with a wheel suspension system according to a preferred embodiment of the invention.

A motor vehicle 1, which is constructed as a passenger car of the sports car category, comprises a schematically illustrated body structure 2, a steering system 3 with a steering wheel 4, and a wheel suspension system 5 for a wheel 6 of a front axle 7. The wheel 6 is equipped with a wheel carrier 8 which is connected with upper and lower triangle-type suspension links 9, 9'. Furthermore, the wheel suspension system 5 has a spring-and-damper unit 10 which has a damper 11 and a coil spring 12. Both are arranged coaxially with respect to one another, the coil spring 12 surrounding the damper 11 at least in sections. By way of a first end 13, the spring-and-damper unit 10 is arranged on the vehicle body structure 2, for example, adjacent to a lower area of a windshield pillar 14 and above the wheel 6 and extends along an axis A—A which extends diagonally from an exterior side 15 of the vehicle to an interior side 16 of the vehicle such that the spring-and-damper unit 10 takes up an approximately horizontal position in the motor vehicle 1.

A lever 18 is linked to a second end 17 of the spring-and-damper unit 10, which lever 18 extends close to the wheel 6, can be swiveled about an axis B—B extending relatively upright or in a correspondingly inclined manner in the motor vehicle 1, and comprises a first lever section 19, a second lever section 20 and a third lever section 21. The first lever section 19 is connected to the spring-and-damper unit 10; the second lever section 20 is connected to a first link 22; and the third lever section 21 is connected to a second link 23. The first link 22 interacts with the wheel carrier 8 and the second link interacts with a stabilizer 24 which is arranged transversely in the motor vehicle 1.

Figure 3:
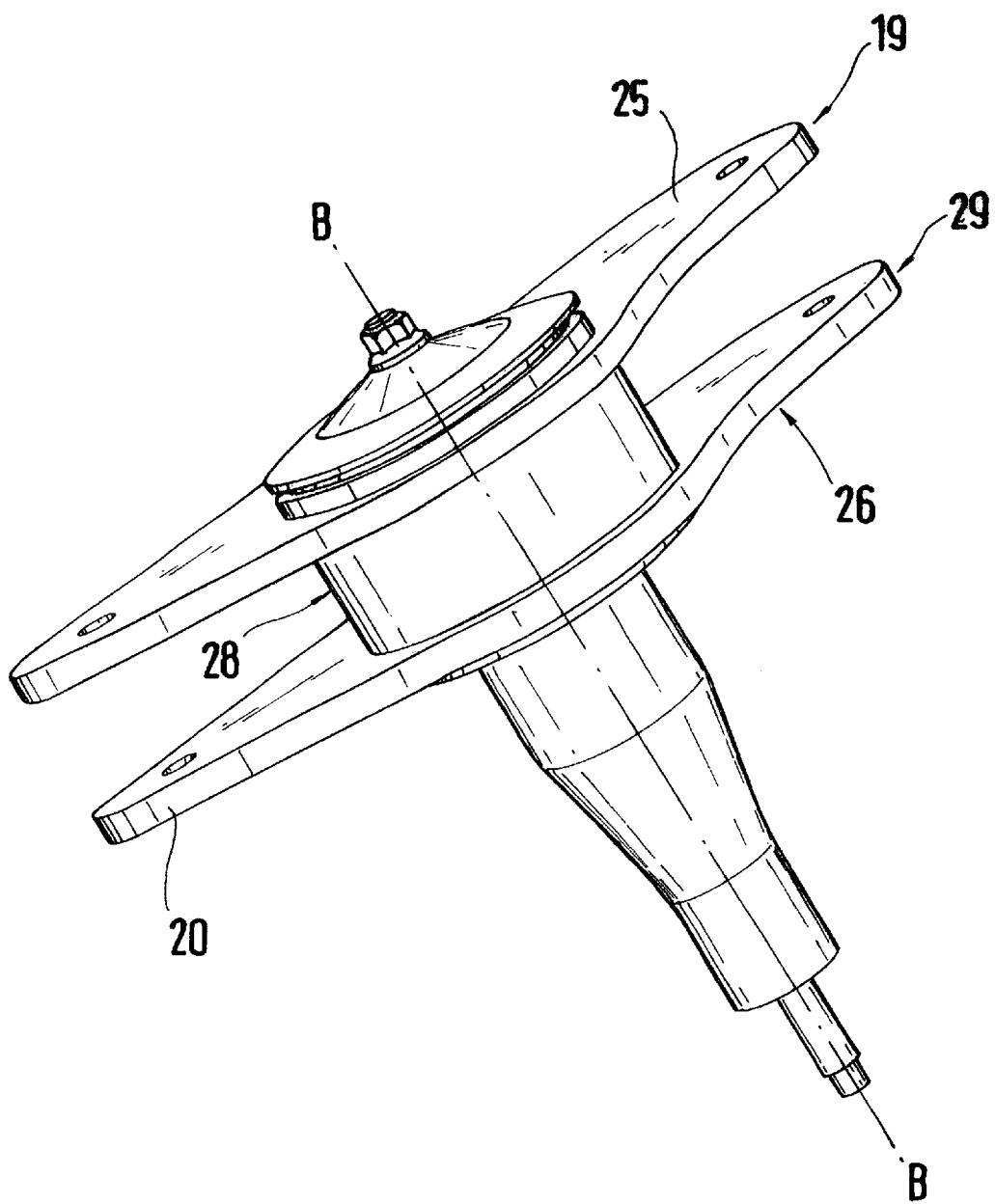
FIG. 3 shows an enlarged diagonal view of a detail of FIG. 1.
Figure 4:
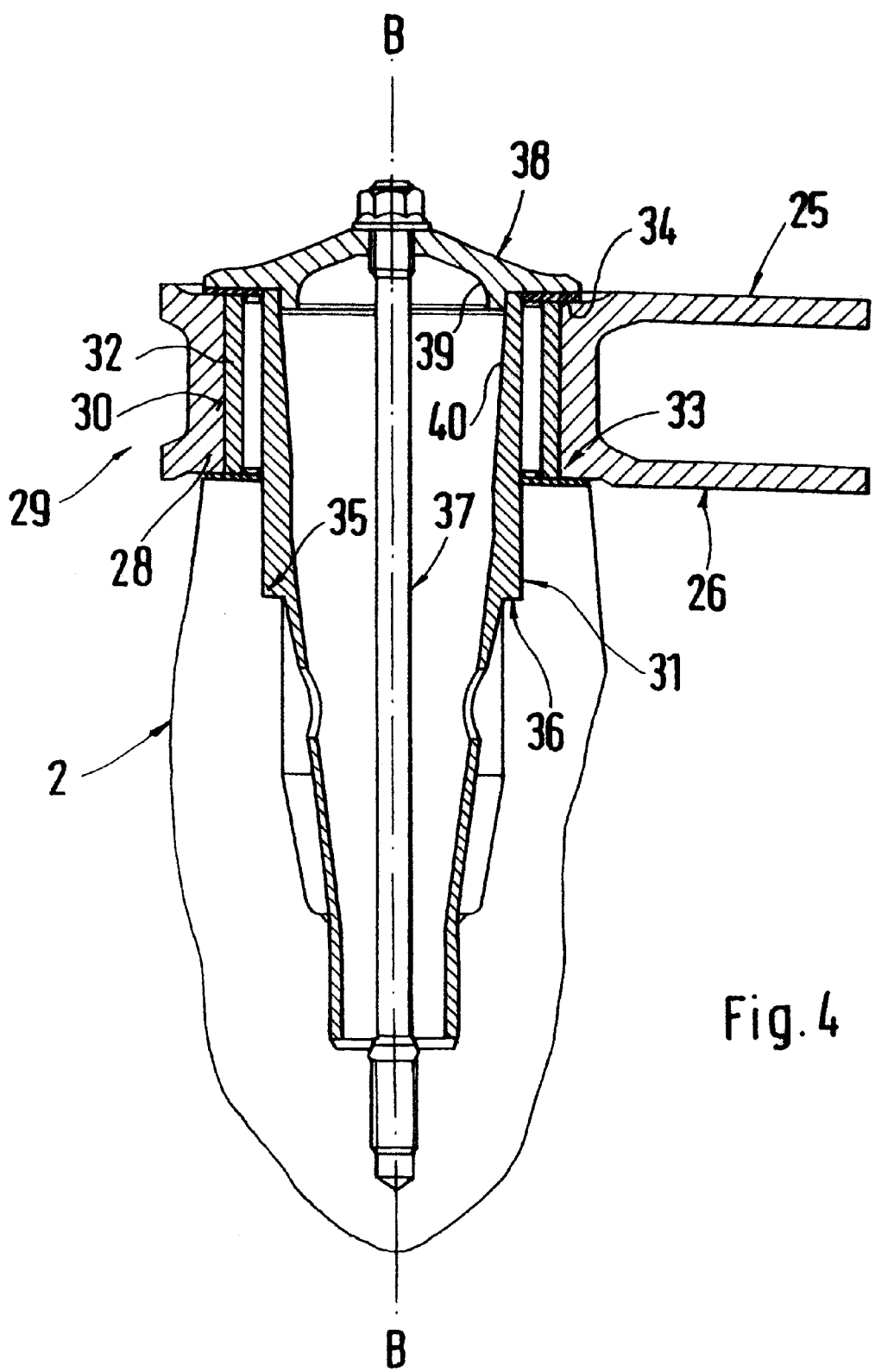
FIG. 4 shows an enlarged sectional view according to Line IV—IV of FIG. 3.

In the area of the lever sections 19, 20, 21, the lever 18 is provided with spaced bearing plates 25, 26, between which the links 22, 23 or a piston rod end 27 of the spring-and-damper unit 10 are inserted. The bearing plates 25, 26, which are arranged parallel to one another, form a constructional unit 29, as in FIG. 3, together with a circular-cylindrical bearing body 28, into which bearing body 28, a bearing bore 30 is machined. The bearing body 28 or the bearing bore 30 surrounds a bearing journal 31, and the lever 18 is held by way of the bearing journal 31 in position on the vehicle body structure 2, as in FIG. 4. A roller bearing 32, such as a needle bearing, is arranged between the bearing bore 30 and the bearing journal 31.

For the axial fixing in the area of the bearing body 28 and of the roller bearing 32, the lever 18 is clamped between a supporting plate 33 and a clamping plate 34. For this purpose, the bearing journal 31 rests on one side by way of a supporting collar 35 on a supporting shoulder 36 of the vehicle body structure 2 and, on the other side, a screw bolt 37 holds the bearing journal 31 and the lever 18 in position by way of a clamping disk 38. The clamping disk 38 projects over the clamping plate 34 and, by way of a fixing collar 39, engages in a bore 40 of the bearing journal 31.

Figure 2:
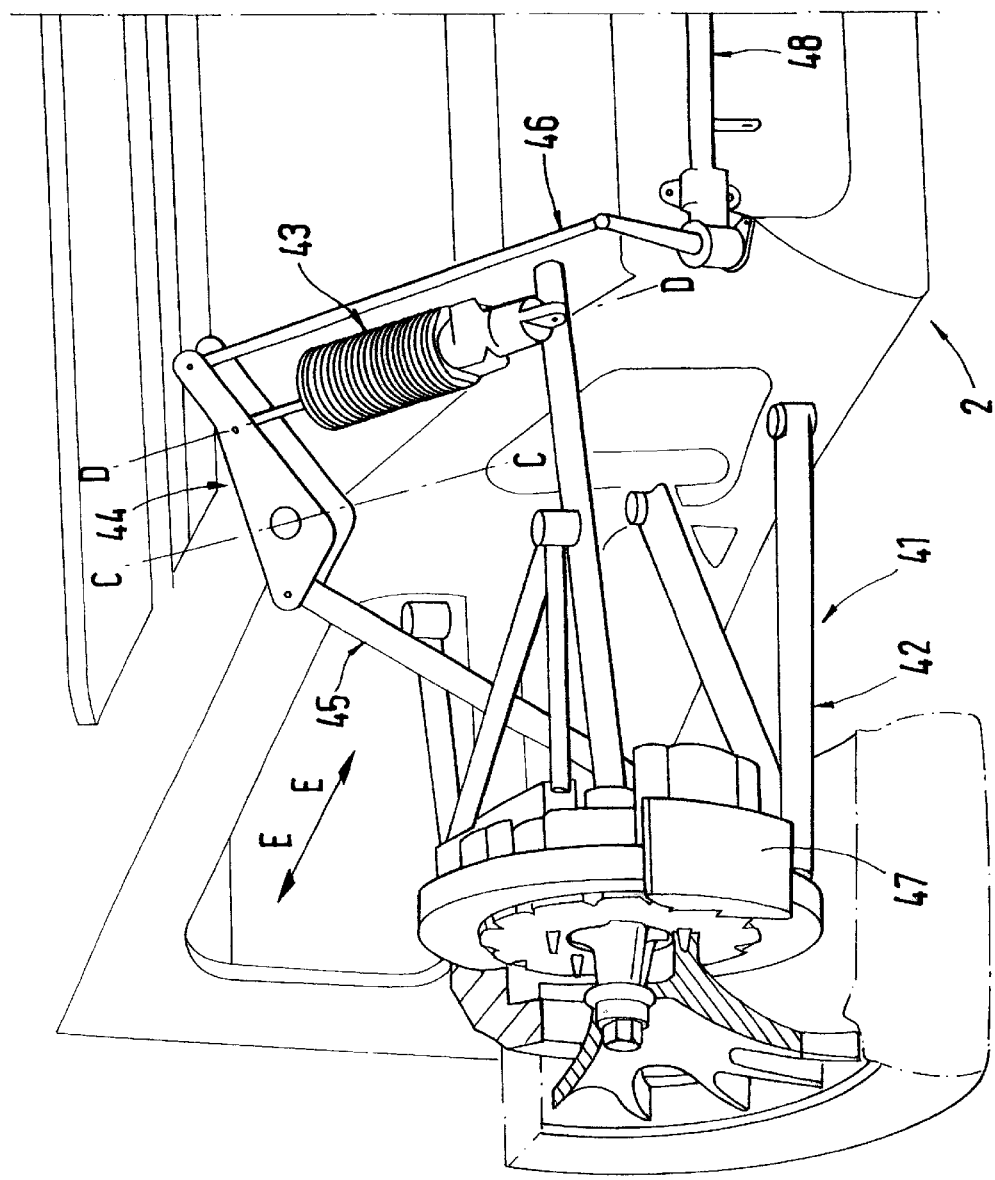
FIG. 2 shows a partial diagonal view of a motor vehicle from the rear with a wheel suspension system according to another preferred embodiment of the invention.

FIG. 2 illustrates a rear axle 41 of the motor vehicle 1 whose wheel suspension system 42 also has a spring-and-damper unit 43 of the horizontal type and a lever 44 which can be swivelled about an axis C—C. The axis C—C also extends essentially upright in the motor vehicle 1. In contrast, the axis D—D of the horizontal spring-and-damper unit 43 extends approximately in the longitudinal direction E—E of the vehicle. The lever 44 is connected with first and second links 45 and 46 which cooperate with a wheel carrier 47 and a stabilizer 48 respectively. A bearing journal, which is not shown, is used for holding the lever 44 on the vehicle body structure 2, which bearing journal is, however, comparable with the bearing journal 31 described above.

Figure 5:
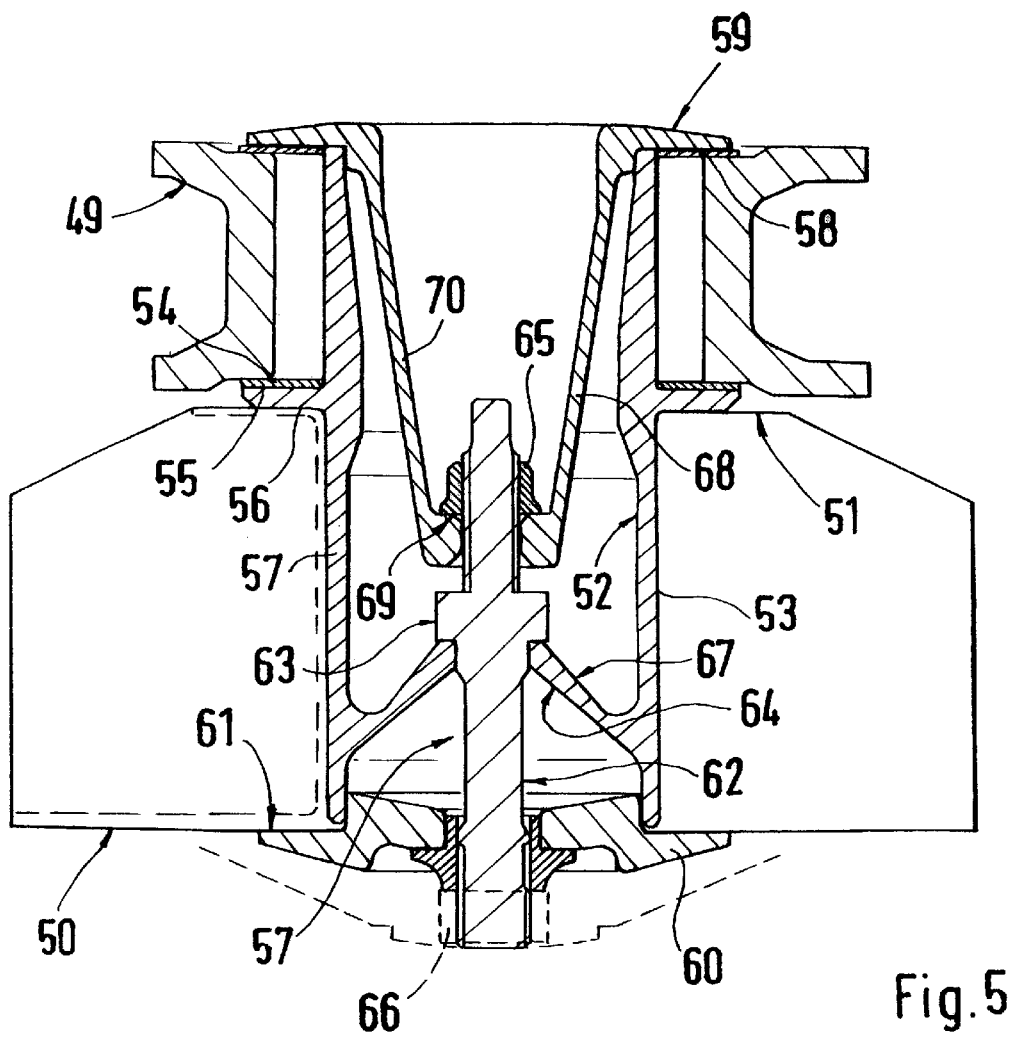
FIG. 5 shows a view according to FIG. 5 with another embodiment.

According to FIG. 5, a lever 49 is disposed on a vehicle body structure 50 which is of a composite material, such as high-strength and low-weight carbon-fiber reinforced plastic. The lever 49 projects over a wall 51 of the vehicle body structure 50, and a bearing journal 52 penetrates a passage opening 53 of the wall 51. By way of a carrying collar 55 accommodating a supporting plate 54, the bearing journal 52 rests on a first wall section 56 of the wall 51 and is guided in the passage opening 53 by way of a sleeve section 57. Furthermore, the bearing journal 52 and the lever 49 are fastened on the wall 51 by way of a holding device 72.

The holding device 72 comprises a first clamping device 59 which rests on a clamping plate 58 of the lever 49, and a second clamping device 60 which rests on a second wall section 61 extending at a distance from the first wall section 56. A screw bolt 62 acts between the clamping devices 59 and 60. By way of a pin widening 63, the screw bolt 62 is supported on a ring support 64 of the hollow bearing journal 52 and is provided with a first screw nut 65 and a second screw nut 66 which act upon the first clamping device 59 and the second clamping device 60 respectively. The ring support 64 has a conical section 67 which tapers in the direction of the pin widening 63. The first clamping device 59 has a sleeve-type extension 68 which is provided with a supporting surface 69 for the second screw nut 65, which supporting surface 69 extends adjacent to the pin widening 63. Finally, the extension 68 comprises a conical section 70 which tapers in the direction of the pin widening 63.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A wheel suspension system for a motor vehicle, comprising an approximately horizontally positioned spring-and-damper unit which, by way of levers and links, interacts with wheel carriers of opposite wheels, wherein for a wheel, the horizontally positioned spring-and-damper unit and a lever is provided which said lever can be swivelled about one of an upright and inclined axis and which, by way of a first lever section, said lever is applied to the spring-and-damper unit, by way of a second lever section as well as a first link, is connected to the wheel carrier of the wheel and, by way of a third lever section as well as a second link, is connected to a stabilizer.

2. A wheel suspension system according to claim 1, wherein the spring-and-damper unit extends adjacent to the wheel along an axis extending from an exterior side of the vehicle to an interior side of the vehicle, and wherein the lever is guided close to the wheel.

3. A wheel suspension system according to claim 1, wherein the spring-and-damper unit is approximately aligned in a longitudinal direction of the vehicle, the spring-and-damper unit and the lever being arranged adjacent to the wheel.

4. A wheel suspension system according to claim 1, wherein the lever has spaced bearing plates in an area of the lever sections, and wherein between the bearing plates the links are inserted.

5. A wheel suspension system according to claim 4, wherein the bearing plates form a constructional unit with a cylindrical bearing body, the bearing body being provided with a bearing bore.

6. A wheel suspension system according to claim 5, wherein the bearing body or the bearing bore surrounds a bearing journal and is fixed thereto, the bearing journal (31) and the lever being held in position on a vehicle body structure.

7. A wheel suspension system according to claim 6, wherein a roller bearing is arranged between the bearing bore and the bearing journal.

8. A wheel suspension system according to claim 7, wherein in an area of the bearing bore and the roller bearing, the lever is clamped between a supporting plate and a clamping plate.

9. A wheel suspension system according to claim 6, wherein, by way of a supporting collar, the bearing journal rests on a supporting shoulder of the vehicle body structure, a screw bolt clamping the bearing journal against the supporting shoulder by way of a clamping disk.

10. A wheel suspension system according to claim 7, wherein, by way of a supporting collar, the bearing journal rests on a supporting shoulder of the vehicle body structure, a screw bolt clamping the bearing journal against the supporting shoulder by way of a clamping disk.

11. A wheel suspension system according to claim 8, wherein, by way of a supporting collar, the bearing journal rests on a supporting shoulder of the vehicle body structure, a screw bolt clamping the bearing journal against the supporting shoulder by way of a clamping disk.

12. A wheel suspension system according to claim 9, wherein the clamping disk projects over the clamping plate and engages by way of a fixing collar in a bore of the bearing journal.

13. A wheel suspension system according to claim 10, wherein the clamping disk projects over the clamping plate and engages by way of a fixing collar in a bore of the bearing journal.

14. A wheel suspension system according to claim 11, wherein the clamping disk projects over the clamping plate and engages by way of a fixing collar in a bore of the bearing journal.

15. A wheel suspension system according to claim 1, wherein the motor vehicle is provided with a vehicle body structure made of a composite material,
wherein the lever projects over a wall of the vehicle body structure, and a bearing journal penetrates a passage opening in the wall, the bearing journal resting by way of a carrying collar accommodating a supporting plate on a first wall section of the wall and being guided in the passage opening by way of a sleeve section, and
wherein the bearing journal and the lever are fastened to the wall by way of a holding device.

16. A wheel suspension system according to claim 2, wherein the motor vehicle is provided with a vehicle body structure made of a composite material,
wherein the lever projects over a wall of the vehicle body structure, and a bearing journal penetrates a passage opening in the wall, the bearing journal resting by way of a carrying collar accommodating a supporting plate on a first wall section of the wall and being guided in the passage opening by way of a sleeve section, and
wherein the bearing journal and the lever are fastened to the wall by way of a holding device.

17. A wheel suspension system according to claim 3, wherein the motor vehicle is provided with a vehicle body structure made of a composite material,
wherein the lever projects over a wall of the vehicle body structure, and a bearing journal penetrates a passage opening in the wall, the bearing journal resting by way of a carrying collar accommodating a supporting plate on a first wall section of the wall and being guided in the passage opening by way of a sleeve section, and
wherein the bearing journal and the lever are fastened to the wall by way of a holding device.

18. A wheel suspension system according to claim 4, wherein the motor vehicle is provided with a vehicle body structure made of a composite material,
wherein the lever projects over a wall of the vehicle body structure, and a bearing journal penetrates a passage opening in the wall, the bearing journal resting by way of a carrying collar accommodating a supporting plate on a first wall section of the wall and being guided in the passage opening by way of a sleeve section, and
wherein the bearing journal and the lever are fastened to the wall by way of a holding device.

19. A wheel suspension system according to claim 8, wherein the motor vehicle is provided with a vehicle body structure made of a composite material,
wherein the lever projects over a wall of the vehicle body structure, and a bearing journal penetrates a passage opening in the wall, the bearing journal resting by way of a carrying collar accommodating a supporting plate on a first wall section of the wall and being guided in the passage opening by way of a sleeve section, and
wherein the bearing journal and the lever are fastened to the wall by way of a holding device.

20. A wheel suspension system according to claim 12, wherein the motor vehicle is provided with a vehicle body structure made of a composite material,
wherein the lever projects over a wall of the vehicle body structure, and a bearing journal penetrates a passage opening in the wall, the bearing journal resting by way of a carrying collar accommodating a supporting plate on a first wall section of the wall and being guided in the passage opening by way of a sleeve section, and
wherein the bearing journal and the lever are fastened to the wall by way of a holding device.

21. A wheel suspension system according to claim 19, wherein the holding device comprises a first clamping device, which rests against the clamping plate, and a second clamping device, which rests against a second wall section of the wall extending at a distance from the first wall section, a screw bolt extending between the clamping devices, by way of the screw bolt the clamping devices being held in position.

22. A wheel suspension system according to claim 21, wherein the screw bolt is supported by way of a pin widening on a ring support of the bearing journal and has a first screw nut and a second screw nut, the first screw nut being applied to the first clamping device and the second screw nut being applied to the second clamping device.

23. A wheel suspension system according to claim 22, wherein the ring support has a conical section which tapers in a direction of the pin widening.

24. A wheel suspension system according to claim 22, wherein the second clamping device has a sleeve-type extension with a supporting surface for the second screw nut which extends adjacent to the pin widening.

25. A wheel suspension system according to claim 24, wherein the sleeve extension has a conical section which tapers in a direction of the pin widening.

26. A damping assembly for a vehicle, comprising:
a damper,
a spring arranged with the damper, the spring and damper being operatively connected to the vehicle, being positioned approximately horizontally and operatively interacting with wheel carriers of opposing wheels, and
a lever swivellable about an approximately vertical axis, the lever being connected to the spring and damper via a first lever section, to one of the wheel carriers via a second lever section and a first link and to a stabilizer via a third lever section and a second link.

27. A damping assembly for a vehicle according to claim 26, wherein the lever is connected to a body structure of the vehicle via a bearing journal.

28. A damping assembly for a vehicle according to claim 26, wherein the spring and damper are adjacently above the wheel, and
wherein the lever is adjacent the wheel.

29. A method of making a wheel suspension system for a vehicle, comprising:
- positioning a spring-and-damper unit approximately horizontally which operatively interacts with wheel carriers of opposite wheels via levers and links,
- providing a lever which is swivellable about an approximately vertical or inclined axis,
- connecting the lever to the spring-and-damper unit via a first lever section,
- connecting the lever to one of the wheel carriers via a second lever section and a first link, and
- connecting the lever to a stabilizer via a third lever section and a second link.

30. A method of making a wheel suspension system for a vehicle according to claim 29,
  wherein the spring-and-damper unit extends adjacent to the wheel along an axis extending from an exterior side of the vehicle to an interior side of the vehicle, and wherein the lever is guided close to the wheel.

31. A method of making a wheel suspension system for a vehicle according to claim 29,
  wherein the spring-and-damper unit is approximately aligned in a longitudinal direction of the vehicle, the spring-and-damper unit and the lever being arranged adjacent to the wheel.

* * * * *